(12) United States Patent
Conforti

(10) Patent No.: US 6,682,121 B1
(45) Date of Patent: Jan. 27, 2004

(54) SUN SHADE

(76) Inventor: Carl J. Conforti, P.O. Box 6315, Fall River, MA (US) 02724

( * ) Notice: Subject to any disclaimer, the term of this patent is extended or adjusted under 35 U.S.C. 154(b) by 0 days.

(21) Appl. No.: 10/287,311

(22) Filed: Nov. 4, 2002

Related U.S. Application Data
(60) Provisional application No. 60/400,555, filed on Aug. 2, 2002.

(51) Int. Cl.$^7$ .................................................. B60J 3/00
(52) U.S. Cl. .................... 296/97.5; 296/97.7; 296/97.1; 160/370.21
(58) Field of Search ................ 296/97.1, 97.2, 296/97.5, 97.7, 97.8, 97.9, 95.1, 136; 160/370.21, DIG. 3

(56) References Cited

U.S. PATENT DOCUMENTS

| | | | | |
|---|---|---|---|---|
| 2,547,101 A | * | 4/1951 | Uttz | 224/539 |
| 4,607,875 A | * | 8/1986 | McGirr | 296/97.7 |
| 4,790,591 A | * | 12/1988 | Miller | 160/370.21 |
| 4,823,859 A | * | 4/1989 | Park | 160/370.22 |
| 4,943,103 A | * | 7/1990 | Rosen | 296/97.1 |
| 4,944,547 A | * | 7/1990 | Watts et al. | 296/97.8 |
| 5,064,239 A | * | 11/1991 | Folcik | 296/97.7 |
| 5,123,468 A | * | 6/1992 | Mater, Jr. | 150/168 |
| 5,183,094 A | * | 2/1993 | Montasham et al. | 160/370.21 |
| 5,494,329 A | * | 2/1996 | Gonzalez et al. | 297/184.13 |
| 5,632,318 A | * | 5/1997 | Wang | 160/370.21 |
| 6,095,230 A | * | 8/2000 | Mitchell et al. | 160/370.21 |
| 6,120,085 A | * | 9/2000 | Wooldridge | 296/97.8 |

* cited by examiner

Primary Examiner—Joseph D. Pape
(74) Attorney, Agent, or Firm—Shane H. Hunter

(57) ABSTRACT

A sun shade for use with and mounting to a side or rear automobile window includes a material comfigured to inhibit sunlight from passing through the material while allowing sufficient light to pass through the material such that a person can see through the material, and a temperature indicator coupled to the material and configured to provide a visible indication of temperature, where the sun shade is configured to attach to the side or rear automobile window.

22 Claims, 6 Drawing Sheets

SUN SHADE

CROSS-REFERENCE TO RELATED ACTIONS

This application claims the benefit of U.S. Provisional Application Serial No. 60/400,555 filed Aug. 2, 2002 and entitled "Sun Shade Device."

FIELD OF THE INVENTION

The invention relates to sun shades and more particularly to sun shades for automobiles.

BACKGROUND OF THE INVENTION

When direct sun light enters an automobile it produces some often undesirable effects. Some often undesirable effects include heating the interior of the automobile, heating surfaces of the automobile, and making it difficult for passengers in the automobile to see or to comfortably see, and fading colors of items in the automobile (e.g., leather or cloth covering seats of the car). For example, cars in direct sunlight may reach inside temperatures of greater than 100° F. and more that are undesirable and even dangerous for persons, especially children, animals, and other temperature-sensitive items (e.g., batteries, low melting-point items). The components of the car's interior may retain the heat and create a potentially dangerous situation and/or an uncomfortable environment. Thus, it is often useful to block a window to obstruct the rays from entering the automobile acting as a barrier to limit/reduce the heat generated by the direct sunlight. It is also often desirable to reduce direct rays of sun passing through a window onto passengers themselves or areas that may come in contact with the passengers.

There are shades for blocking direct sun rays from entering automobiles that exist in the market today. For example, there are shades that may be collapsed for storage and expanded for use. These shades may be, e.g., cardboard that folds or a plastic containing wires or rods that bias the shade toward an expanded condition. Other shades provide a retractable blind that can be rolled up for storage and extended/unrolled for use. Still other shades comprise a sheet of tinted yet transparent material of a square or rectangular shape. Shades for side or rear windows of a car typically are shaped as rectangles or ovals and are made from vinyl or textile materials. Current shades typically cover a portion of a window and can be positioned to try to inhibit rays from reached a particular spot inside the automobile, e.g., a child's face. For example, many shades can be affixed to a side or rear window using suction cups that include metal components.

SUMMARY OF THE INVENTION

In general, in an aspect, the invention provides a sun shade including a shade material configured to inhibit light from passing through the material, the material having a trapezoidal shape when in an open state and being configured to expand from the open state to an expanded state, and an attaching mechanism configured to repeatably and releasably attach the shade to a window.

Implementations of the invention may include one or more of the following features. The shade material is configured to be stretched bi-directionally. The shade material is configured to be stretched bi-directionally at least about 10% in any direction. The shade material is configured to be stretched bi-directionally at least about 30% in any direction. The attaching mechanism comprises a plurality of components disposed adjacent respective corners of the shade material. The attaching mechanism comprises a plurality of suction cups. The material is configured to accommodate a first arrangement of fastening devices disposed in a trapezoidal configuration with the material in the open state and to accommodate a second arrangement of fastening devices disposed in a rectangular configuration with the material in the open state.

Implementations of the invention may also include one or more of the following features. The attaching mechanism comprises a hook-shaped clip coupled to the material and extending beyond a perimeter of the material, the clip being configured to snugly receive an edge of an automobile window. The attaching mechanism comprises at least one tacky member configured to stick to the window. The at least on tacky member comprises a plurality of tacky members disposed adjacent an edge of the material and displaced from each other. The shade may further comprise a temperature indicator. The temperature indicator comprises a thermochromatic ink. The shade is substantially free of metal components. The attaching mechanism is configured to attach the material to the window in a trapezoidal or a rectangular configuration with the material being taut between at least portions of the attaching mechanism used to attach the material to the window in the respective configuration.

In general, in another aspect, the invention provides a sun shade for use with an automobile window, the shade including a material configured to inhibit sunlight from passing through the material, and a temperature indicator coupled to the material and configured to provide a visible indication of temperature.

Implementations of the invention may include one or more of the following features. The material is configured to be bi-axially expandable and has a trapezoidal shape. The shade further includes a coupling apparatus coupled to the material and configured to be repeatedly attached to and detached from a window. The shade is free of metal disposed for direct contact by a person. The coupling apparatus is configured to attach the material to the window at at least four first positions in a rectangular arrangement with the material stretched taut between the at least four first positions and to attach the material to the window at at least four second positions in a trapezoidal arrangement with the material stretched taut between the at least four second positions.

Various aspects of the invention may provide one or more of the following advantages. A sun shade can be easily fitted to a variety of sizes and shapes of windows (e.g., both front and rear side windows of automobiles) to inhibit rays of sun from entering an automobile (i.e., not all rays incident upon the shade will pass through the shade). A sun shade can be adjusted to cover substantially all, and possibly all, of a window to inhibit light from passing through the window and into an automobile. Heat produced due to sunlight can be reduced, e.g., within an interior of an automobile including surfaces of items in the automobile. Greater portions of a window can be screened than with previous sun shades. Indications of temperature, e.g., inside an automobile, may be provided on a sun shade. Sun rays may be inhibited, including ultraviolet (UV) rays, from passing through a sun shade. A sun shade may be provided that is easy and compact to store. A sun shade for use on automobile windows for seats where children will ride may be provided with child-safe materials. A single sun shade may be adapted and fit to different windows, including windows on opposite sides of an automobile. A sun shade can be reused and adapted for a variety of shapes of windows.

These and other advantages of the invention, along with the invention itself, will be more fully understood after a review of the following figures, detailed description, and claims.

DETAILED DESCRIPTION OF PREFERRED EMBODIMENTS

At least some embodiments of the invention provide techniques for inhibiting sunlight. For example, sun shades are provided that can reduce sunlight from reaching selected regions, e.g., interiors of automobiles, through windows. Embodiments of the invention use a bi-axially stretchable/expandable yet resilient material that can be stretched beyond its normal resting shape to cover more of a window, e.g., to substantially conform to a shape of a window that the shade is to cover, and can be attached, e.g., to the window. Such embodiments will retake their original shapes when removed, e.g., from the window and can be repeatedly stretched, preferably without substantially affecting the shades' normal resting shapes.

Figure 1:
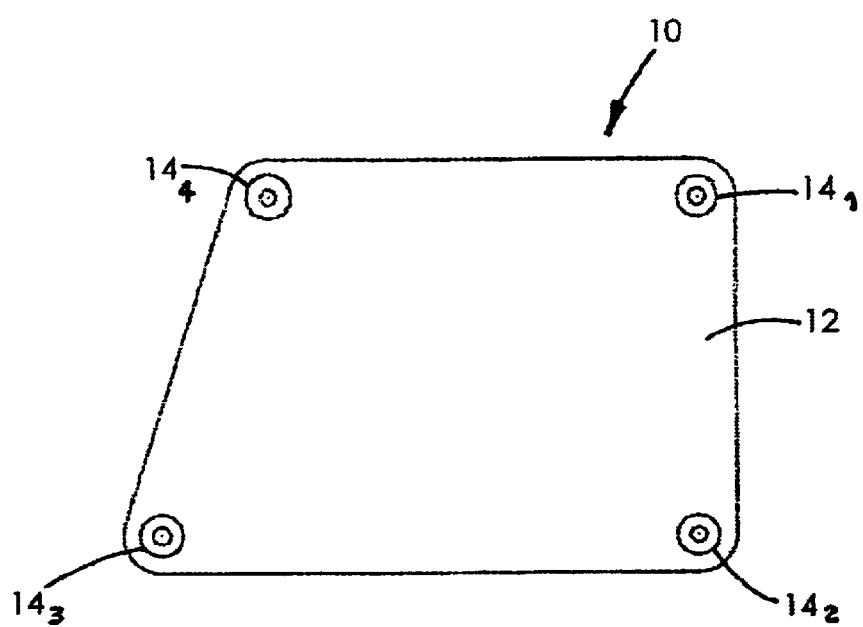
FIG. 1 is a top view of a sun shade using four fastening devices for attachment to a window.

Referring to FIG. 1, a sun shade 10 comprises an expandable, resilient material 12 and fastening devices 14, here four suction cups, for fastening the shade 10 to a window. The material 12 is expandable/stretchable, and preferably bi-axially expandable from its fully open, unbiased shape, and to return to substantially its unbiased shaped after being expanded. There may be some permanent expansion of the material 12 after being stretched/expanded. The material 12 is also capable of inhibiting, but preferably not completely blocking, at least visible light from passing through the material 12. Thus, preferably persons may look through the material 12 while the material 12 provides some sunlight-inhibiting properties, e.g., visible light inhibiting and/or ultraviolet light inhibiting properties.

The material 12 can be any of a variety of materials that can expand beyond its normal, resting position, in which the shade is not biased to span a larger area, and can inhibit sunlight. For example, the material 12 may be a nylon and rubber mesh that provides a bi-axially expandable material with resiliency to return the shade 10 to its original, or substantially to its original, shape when not forced to a larger shape. Preferably, if the material 12 is a mesh it is configured to stretch to accommodate different window sizes while still providing adequate shading. Also preferably, the material 12 can expand or be bi-axially stretched in any direction at least about 105% of its resting measurement along that direction. Even more preferably, the material 12 can be stretched at least about 110% of its resting length or measurement in any direction. Even more preferably, the material 12 can be stretched up to at least about 140% of its resting length in any direction, or more if desired. There is no theoretical maximum percentage of resting length that the material 12 should not be configured to be stretched to, as long as the shade 10 can still provide adequate shading characteristics, will still be able to be attached to a window, and will return to substantially its resting length after being stretched.

The material 12 has a shape configured to help fit the shade 10 to windows, e.g., automobile side windows. As shown, in a fully open resting state (non-biased/stretched) the shade 10 has a trapezoidal shape (with curved corners), although other shapes (e.g. square) and configurations of corners (e.g., sharp) are acceptable. This shape is configured to help the shade 10 fit automobile windows, e.g., automobile side windows, or combinations of side windows, that have trapezoidal or nearly trapezoidal shapes. The shade 10 is preferably sized to be smaller than typical windows to which the shade will be fit to allow the shade to be stretched to custom fit the window. For example, the shade 10 may be about 16–20 inches wide along its top, about 20–24 inches wide along its bottom, and about 12–14 inches high. The shade 10 may, however, accommodate windows that are smaller than the shade 10, in any or all dimensions (e.g., length, width) of the shade 10. Preferably, the shade 10 is free of metal, or at least significant amounts of metal or metal that is disposed such that it could be touched, as such metal components can heat up and be hazardous touch (e.g., to an infant, pet, or adult).

Figure 2:
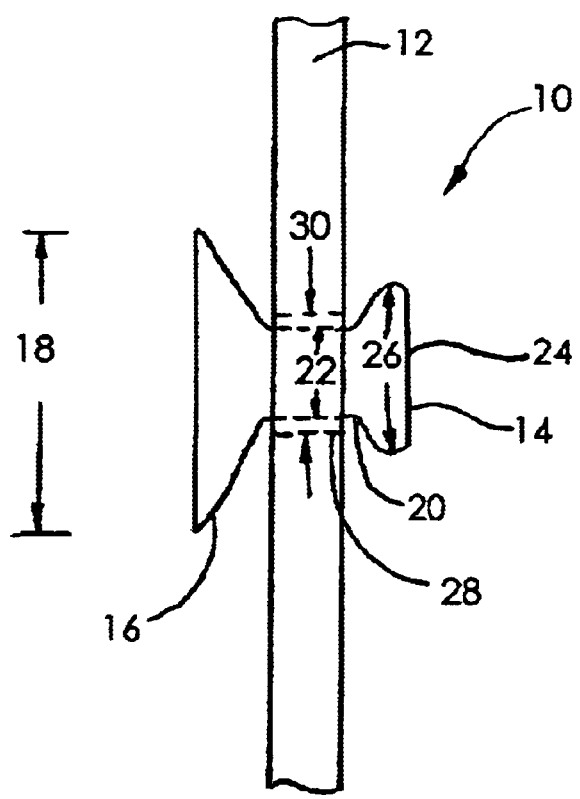
FIG. 2 is a side view of a portion of the shade, including a fastening device of the shade, shown in FIG. 1.

The fastening devices 14 are positioned near a periphery of the shade 10 and preferably in selected positions to help retain the shade 10 in a desired expanded shape. As shown, the devices 14 are disposed in a trapezoidal layout near the four corners of the trapezoid formed by the material 12 in its unexpanded shape. As shown in FIG. 2, the fastening devices are preferably, though not required to be, made of a single piece of deformable plastic with a cup portion 16 having a resting diameter 18, a neck portion 20 of a diameter 22, and a top portion 24 of a diameter 26. As shown, the diameters 18 and 26 of the cup 16 and the top 24 are larger than the diameter 22 of the narrowed neck 20. The material 12 is provided with holes 28, preferably reinforced such as with stitching, (with diameters 30 of about the diameter 22 of the neck 20, but that can be expanded to allow the devices 14, e.g., the tops 24, to be inserted through the holes 28. Alternatively, grommets may be attached, e.g., welded, to the material 12 about the holes 28, or other mechanical structures may be attached to the material 12 to reinforce the holes 28. Thus, to assemble the shade 10, the tops 24 of the devices 14 are inserted though the holes 28 until the necks 20 receive the material 12. The fastening devices 14 can be removed and reversed to allow the shade 10 to accommodate a window on an opposite side of a car. Further, the material 12, in addition to or in place of the fastening devices 14, may be configured to attach to a window, e.g., if the material 12 is a tacky material such as a tacky vinyl.

Figure 3:
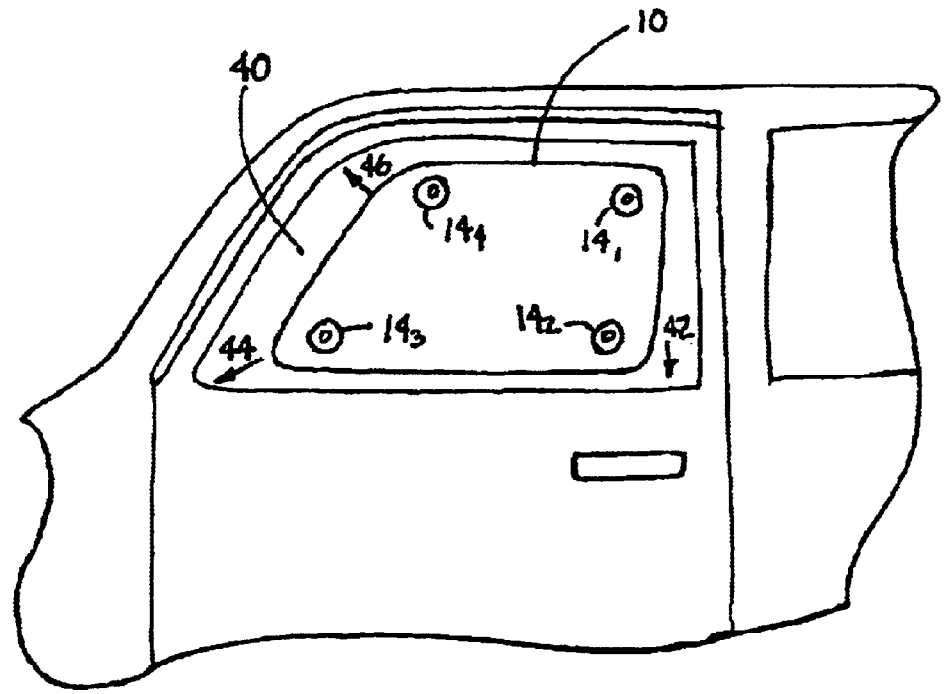
FIG. 3 is a top view of the shade shown in FIG. 1 affixed to an automobile window in a relaxed state.
Figure 4:
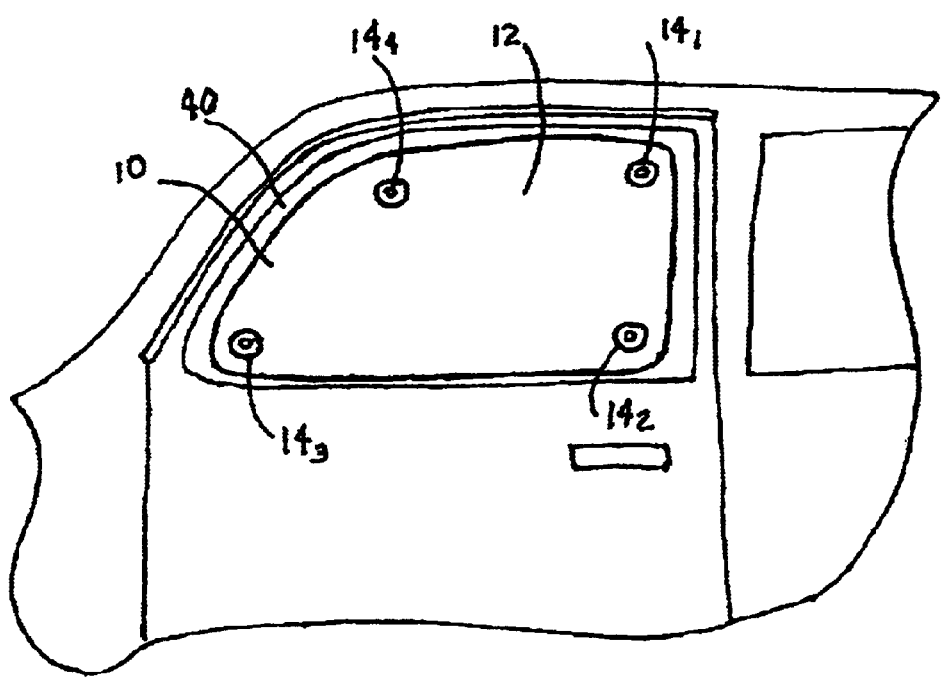
FIG. 4 is a top view of the shade shown in FIG. 1 affixed to an automobile window in a fitted, stretched state.

In operation, referring to FIGS. 3–4, with further reference to FIGS. 1–2, a process for fitting the shade 10 to an automobile window (for exemplary purposes only) is shown. As shown in FIG. 3, the shade 10 is placed against a window 40. Preferably, one corner, here the upper right corner is placed adjacent the corresponding corner of the window 40 and the fastening device $14_1$, is affixed to the window 40. As shown in FIG. 3, the shade 10 does not fully occupy the window 40. Thus, the other fastening devices $14_2$–$14_4$ are moved toward their respective corners of the window 40 as indicated by arrows 42, 44, 46 to stretch/expand the shade 10 to an expanded state. The devices $14_2$–$14_4$ may be moved by grasping and moving (e.g., pulling) on the devices 14 themselves or by grasping and stretching the material 12. Multiple expanded states of the shade 10 are possible by stretching the shade 10 different amounts and/or in different directions. With the shade 10 in an expanded state fit to the window 40 as shown in FIG. 4, the fastening devices 14$_2$–14$_4$ can be fastened to (pressed against) the window 40. If the fastening devices 14 are removable from the material 12, then the devices 14 can be removed, reversed, and reinserted through the material 12, and the shade 10 attached to a mirror-image window, e.g., on an opposite side of the automobile.

Other embodiments are within the scope and spirit of the appended claims.

Figure 5:
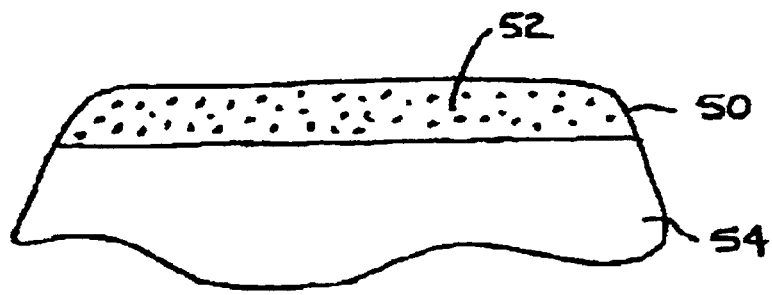
FIGS. 5–8 are portions of top views of shades showing exemplary mechanisms/configurations for attaching shades to windows.
Figure 6:
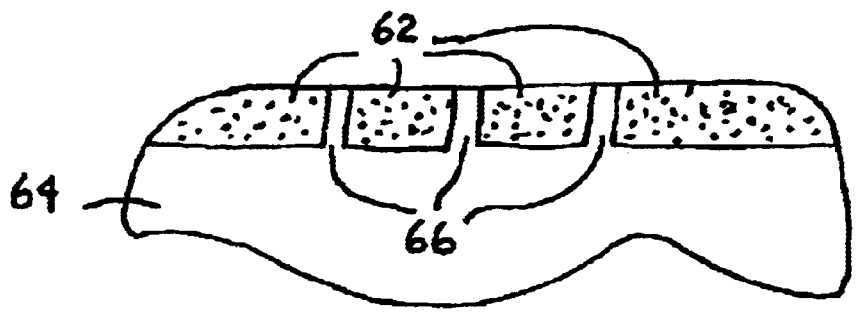
Figure 7:
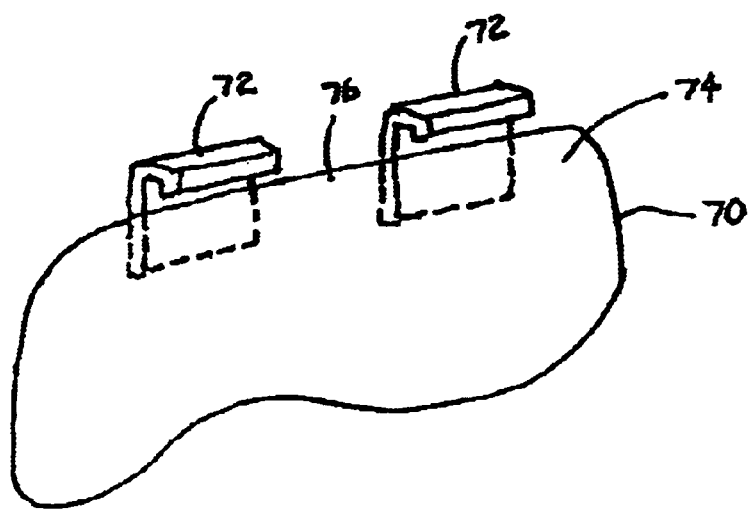

Referring to FIGS. 5–7, various techniques may be provided for attaching sun shades to windows. These figures provide examples, although not an exhaustive list, of possibilities for techniques for attaching sun shades to windows.

As shown in FIG. 5, a shade 50 includes a laminate 52 disposed near a top of the shade 50 and attached, e.g., bonded, to shade material 54. The laminated 52 is configured to repeatably and releasably attach to a window and is preferably configured to stretch with the material 54. A similar laminate may be provided near the bottom of the shade 50 to attach the bottom of the shade 50 to the window. Alternatively, other attachment mechanisms, such as suction cups, or adhesive strips shown in FIG. 6, may be used at the bottom of the shade 50.

Referring to FIG. 6, a shade 60 includes a set of mechanisms 62 for repeatably and releasably attaching to a window. The mechanisms 62 may be adhesive strips or other acceptable materials for providing the desired capabilities. The mechanisms 62 are separated from each other by gaps 66 to help allow the shade 60 to be stretched to accommodate different desired sizes of the shade 60 and to attach to a window. A set of adhesive strips may be provided near the bottom of the shade 60 to attach the bottom of the shade 60 to the window. Alternatively, other attachment mechanisms, such as suction cups, or a laminate strip similar to that shown in FIG. 5, may be used at the bottom of the shade 60.

Referring to FIG. 7, a shade 70 includes clips 72 (here, two hook-shaped clips 72) connected to a stretchable shade material 74 near a top 76 of the material. The clips 72 may be, e.g., welded or bonded to the material 74. The clips 72 are configured to fit over a top of a window, e.g., an automobile window without interfering with closing of the automobile window. For example, the clips 72 may be configured to friction fit to a window, e.g., by having receptacles 78 with widths slightly less (e.g., 0.005 inches) than the width of a window to which the shade 70 will be attached. The clips 72 may be, e.g., rubber, vinyl, polyethelyne, other plastics, metals, etc. A variety of mechanisms may be used near a bottom of the shade 70, e.g., a laminate as shown in FIG. 5, a set of adhesive strips as shown in FIG. 6, or suction cups as shown in FIG. 1. Combinations of these are also possible.

Still other configurations of other attaching mechanisms, or the attaching mechanisms shown and discussed are possible. For example, referring to FIG. 8, a shade 102 is configured similarly to the shade 10 shown in FIG. 1 except that another hole 100 (e.g., reinforced) is provided for removing one of the fastening devices 14, e.g., the device 14$_3$, and inserting the device 14$_3$ through the hole 100. As shown, the hole 100 is disposed such that the hole 100 and the fastening devices 14$_1$, 14$_2$, 14$_4$ provide four corners of a rectangle with the shade 10 in a relaxed (non-stretched, non-biased) state. This configuration may be helpful to fit the shade 10 to a rectangularly shaped (non-trapezoidal) window. Alternatively, another (here fifth) fastening device 14 may be provided in the hole 100, which may or may not be used as desired when fitting the shade 10 to a trapezoidal window.

Figure 8:
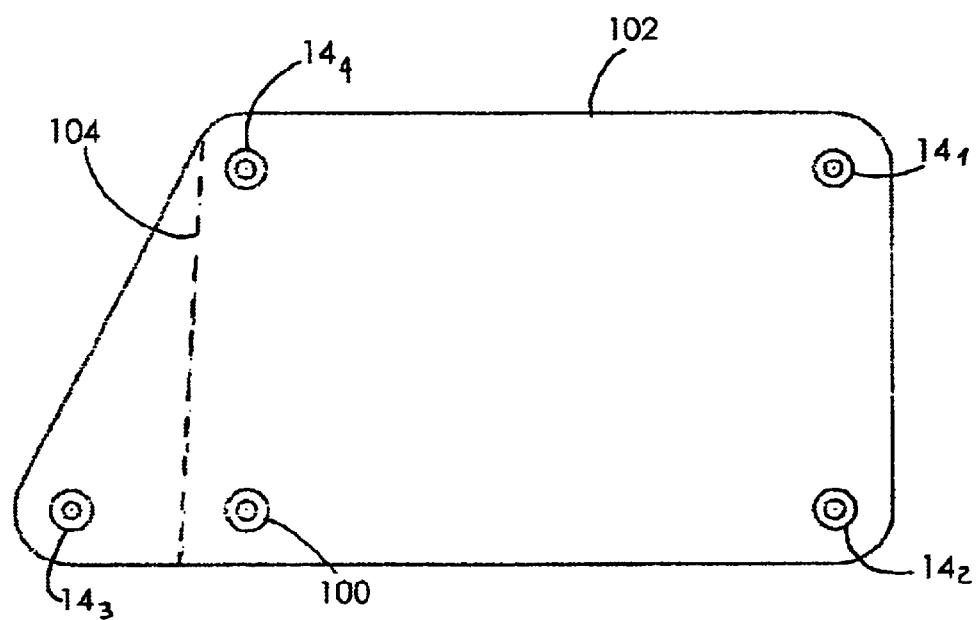

Further, as shown in FIG. 8, the shade 102 may have a perforation 104. A user may tear the shade 102 along the perforation 104 to change the resting shape of the shade 102 from trapezoidal to rectangular, e.g., if the shade 102 will be primarily used for rectangular windows.

Figure 9:
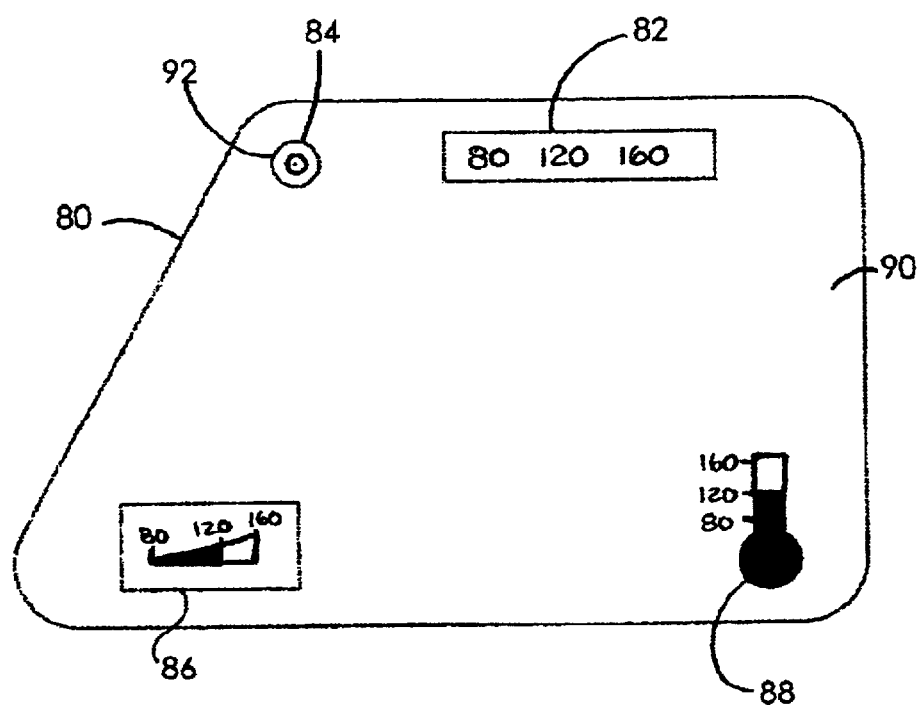
FIG. 9 is a top view of a sun shade showing exemplary temperature indicating mechanisms.

Referring to FIG. 9, a sun shade 80 includes temperature indicators 82, 84, 86. As shown, the temperature indicators 82, 84, 86, 88 can be disposed at various locations relative to a material 90, including on a fastening device 92 (for the indicator 84, and with only one fastening device shown). The indicators 82, 84, 86, 88 can be configured in a variety of ways, e.g., using thermochromatic ink configured to changed colors and/or opacity in response to temperature change. For example, the ink may turn from opaque to clear, or from one color to another (e.g., from blue to white), or vice versa in response to increases in temperature above one or more thresholds, or likewise in response to decreases in temperature below one or more thresholds. The indicators 82, 84, 86, 88 may also be configured as liquid crystal polymers or thermocouples or thermistors and electronic displays. Thermochromatic ink indicators may be disposed on the material 12 and/or the fastening devices 14.

The indicators 82, 84, 86, 88 may have a variety of appearances for providing visible indications of temperature. For example, possible appearances include incremental numbers like the indicator 82, a single color such as the indicator 84 (configured to change e.g., from white to red when the temperature exceeds a threshold), a bar graph such as the indicator 86 (that may provide incremental or continuous temperature indicia), a thermometer bulb such as the indicator 88, or others. Thus, for example, using a thermochromatic ink and a thermometer bulb appearance, more red may appear on the depicted thermometer bulb or on the indicator 86 as the temperature rises, e.g., continuously or in increments. For the indicator 82, the various temperatures may change color (e.g., from white to red) as each of the temperatures is reached. Although four indicators 82, 84, 86, 88 are shown, typically only one indicator will appear on any given shade, although multiple indicators are acceptable. Still other appearances may be used, such as graphical images showing temperatures unsafe for children and/or pets, or changing from a happy face to a sad or sweating face when the temperature exceeds a threshold or acceptable limit.

Still other embodiments are within the scope and spirit of the appended claims. For example, the material 12 can be made of Spandex®, Lycra®, woven or knit nylon or nylon blends, including nylon and rubber blends, (such as used for women's hosiery), vinyl acetate with a softening plasticizer, other plastics, etc. The material may be expandable in a single direction, but is preferably stretchable in any direction in the plane of the material 12. The suction cups 14 may be made in a variety of ways. For example, pieces may be placed on opposite sides of the material 12 and welded together (e.g., with a sonic weld or a heat weld), and may be connected with adhesive or bonded together. Many other techniques for connecting two such pieces are commonly available. Further, other quantities than shown of fastening devices (e.g., 6, 8, etc.) may be used.

What is claimed is:

1. A sun shade for use with and mounting to a side or rear automobile window, the shade comprising:
   a material configured to inhibit sunlight from passing through the material while allowing sufficient light to pass through the material such that a person can see through the material; and
   a temperature indicator coupled to the material and configured to provide a visible indication of temperatures;
   wherein the sun shade is configured to attach to the side or rear automobile window.

2. The shade of claim 1 wherein the material is configured to be bi-axially expandable and has a trapezoidal shape.

3. The shade of claim 1 further comprising a coupling apparatus coupled to the material and configured to be repeatedly attached to and detached from a window.

4. The shade of claim 1 wherein the shade is free of metal disposed for direct contact by a person.

5. The shade of claim 1 wherein the coupling apparatus is configured to attach the material to the window at at least four first positions in a rectangular arrangement with the material stretched taut between the at least four first positions and to attach the material to the window at at least four second positions in a trapezoidal arrangement with the material stretched taut between the at least four second positions.

6. The sun shade of claim 1 wherein the visible indication of temperature indicates whether a temperature in the automobile is unsafe for occupancy of an automobile.

7. A temperature-indicative sun shade for use with and mounting to a side or rear automobile window, the shade comprising:
   flexible material configured to inhibit sunlight from passing from one side of the material to another side of the material, the material having an open position with a perimeter configured such that the material can inhibit light from entering through a substantial portion of the window when in the open position;
   a member coupled to the material; and
   a temperature indicator coupled to the member and configured to provide an indication of a temperature in a vicinity of the shade;
   wherein the sun shade is configured to attach to the side or rear automobile window.

8. The shade of claim 7 wherein the member is configured to be grasped and moved to position the material relative to the window for inhibiting light from reaching an interior of the automobile.

9. The shade of claim 8 wherein the temperature indicator comprises a thermochromatic material configured to change at least one of its color and its opacity in response to a change in temperature in the vicinity of the shade.

10. The shade of claim 9 wherein the temperature indicator comprises a thermochromatic ink configured to change from a relatively higher opacity state to a relatively lower opacity state in response to an increase in the temperature in the vicinity of the shade.

11. The shade of claim 10 wherein the temperature indicatory is configured to substantially conceal an image when the ink is in its relatively higher opacity state and to substantially reveal the image when the ink is in its relatively lower opacity state.

12. The shade of claim 11 wherein the image indicates an undesirably high temperature.

13. The shade of claim 12 wherein the image comprises at least one text character.

14. The shade of claim 12 wherein the image comprises a graphical image.

15. The shade of claim 14 wherein the image comprises at least one of a thermometer bulb, at least one number, a bar graph, and an image of a face.

16. The shade of claim 8 wherein the member is configured to be repeatedly attached to the window.

17. The shade of claim 7 wherein the indicator is configured to provide indicia of at least three different levels of temperature in the vicinity of the shade.

18. The shade of claim 17 wherein the indicator is configured to provide numerical indicia of at least three different temperatures in the vicinity of the shade.

19. The sun shade of claim 7 wherein indication of a temperature indicates whether the temperature in the vicinity of the shade is of a level that is safe for occupancy of an automobile.

20. A temperature-indicative automobile sun shade for use with and mounting to a side or rear automobile window, the sun shade comprising:
    a flexible sheet of semi-transparent material configured to inhibit light from passing through the sheet while allowing some light to pass through the sheet, the sheet being configured to be manipulated into an open position having a shape and size configured to overlay a substantial portion of the window; and
    temperature means coupled to the material for indicating a temperature, the temperature means for providing a visual indication of temperature;
    wherein the sun shade is configured to attach to the side or rear automobile window.

21. The sun shade of claim 20 wherein the temperature means is directly coupled to the sheet of material.

22. The sun shade of claim 20 further compnsing attaching means coupled to the sheet of material and configured to repeatedly attach the sheet of material to the window, wherein the temperature means is coupled to the material through the attaching means.

* * * * *